United States Patent [19]

Wooten

[11] 3,843,257

[45] Oct. 22, 1974

[54] MICROWAVE-EXCITED EMISSION DETECTOR

[75] Inventor: George W. Wooten, Centerville, Ohio

[73] Assignee: Monsanto Research Corporation, St. Louis, Mo.

[22] Filed: June 18, 1973

[21] Appl. No.: 371,337

Related U.S. Application Data

[63] Continuation of Ser. No. 203,351, Nov. 30, 1971, abandoned.

[52] U.S. Cl. .................. 356/85, 356/36, 356/87, 356/244
[51] Int. Cl. ..... G01j 3/30, G01n 1/00, G01n 21/16
[58] Field of Search ............ 356/74, 85, 86, 87, 36, 356/81, 244

[56] References Cited

UNITED STATES PATENTS

| | | | |
|---|---|---|---|
| 2,708,387 | 5/1955 | Broida et al. | 356/85 |
| 3,281,596 | 10/1966 | Williston | 356/36 |
| 3,325,976 | 6/1967 | West | 356/85 |
| 3,419,359 | 12/1968 | Anderson et al. | 356/87 |
| 3,531,202 | 9/1970 | Wilkinson et al. | 356/81 |
| 3,602,595 | 8/1971 | Dahlquist et al. | 356/86 |

OTHER PUBLICATIONS

Emission Spectra...Substances; Kiess et al., 7th Symposium on Combustion, Aug. 28–Sept. 3, 1958, pg. 207–214.
Dr. Jerald Vurek and Dr. Bowman of National Inst. of Health; Chemical and Engineering News, Oct. 9, 67, pg. 65.
Analytical Chemistry, 39, pg. 1398–1405 (1967), Runnels & Gibson.
Anal. Chem. Acta, 54, pg. 233–243 (1971), Aldous et al.

Primary Examiner—Vincent P. McGraw
Attorney, Agent, or Firm—Bruce Stevens

[57] ABSTRACT

A multifunctional, multimode, selective microwave-excited emission detector is described which is capable of detecting and analyzing metallic and nonmetallic compositions of organic or inorganic nature at subnanogram levels on an integrated or real time basis. The detector concept utilizes microwave energy at frequencies of 2.45 GHz (gigahertz, i.e., billion cycles) or higher to excite spectral emission of atomic and/or polyatomic constituents of the composition being analyzed. The microwave-exciting process can be carried out under pressure, at atmospheric pressure or at reduced pressures, however, for increased sensitivity pressures of the order of about 1 Torr or less are preferred and extremely high sensitivities can be attained by carrying out the discharge and excitation in a magnetic field sufficient to sustain the discharge at pressures of the order of $10^{-5}$ to $10^{-6}$ Torr using photon counters for detection. Definitive spectral lines or bands are isolated either by a diffraction grating monochromator or band-pass filters. The emission intensity of the spectral line(s) or band(s), which is a function of concentration, is measured by photomultiplier detectors and ancillary electronic read-out. A temperature-programmed sample pyrolysis probe can be used on liquid or solid samples to circumvent spectral interference problems. A reference channel in the electro-optical portion of the instrument can be used for stabilization or to null-out background or undesired interfering spectral lines. A multichannel optical system can be used to observe a number of different spectral lines at the same time, thereby detecting different emission lines of the same element or lines of a number of different elements simultaneously.

14 Claims, 6 Drawing Figures

MICROWAVE-EXCITED EMISSION DETECTOR

This is a continuation, of application Ser. No. 203,351, filed Nov. 30, 1971, now abandoned.

BACKGROUND OF THE INVENTION

1. Field of the Invention

The invention is in the general field of chemistry, but more particularly is in the field of analytical and control apparatus.

2. Description of the Prior Art

A radio-frequency plasma emission spectrophotometer is described in Analytical Chemistry, Volume 36, No. 2, Feb., 1964, pages 412–415.

In Chemical and Engineering News, Oct. 6, 1969, page 39, the first item under Concentrates, a helium glow photometer that measures as little as $10^{-14}$ moles of metal ions in nanoliter quantities of solution and developed by the American Instrument Company Inc. is described. The instrument is based on a concept originated with Dr. Jerald Vurek and Dr. Robert Bowman of National Institutes of Health (Chemical and Engineering News, Oct. 9, 1967, page 65). The technique consists of vaporizing a sample with heated iridium filament (in a helium atmosphere) into a radio frequency glow discharge and measuring the emitted light as excited metal atoms return to ground-state level. According to the company, the instrument analyzes and gives digital readouts, both for sodium and potassium (or two other metals) in less than 30 seconds, and is not limited to determination of alkali metals.

In the Apr. 5, 1972, Chemical and Engineering News, page 31, the last item under Technology Concentrates describes mercury analysis using a new system for analysis of mercury compounds, such as methylmercuric salts in fish and fungicide residues, which was developed by Dr. Carl A. Bache and Dr. Donald J. Lisk, New York State College of Agriculture, Cornell University, Ithaca, New York. Dr. Lisk tells in C&E News that the system is based on a marriage of gas chromatography to emission spectrometry, using a microwave-powered plasma emission detector. Dr. Lisk says the method is much more specific for mercury than electron capture detection enabling use of pure samples but gives similar sensitivity. The method can also be applied to determination of arsenic compounds.

SUMMARY OF THE INVENTION

A multifunctional, multimode, selective microwave-excited emission detector is described which is capable of detecting and analyzing metallic and nonmetallic compositions of organic or inorganic nature at subnanogram levels on an integrated or real time basis. The detector concept utilizes microwave energy at frequencies of 2.45 GHz (gigahertz, i.e., billion cycles) or higher to excite spectral emission of atomic and/or polyatomic constitutents of the composition being analyzed. The microwave-exciting process can be carried out under pressure, at atmospheric pressure or at reduced pressures, however, for increased sensitivity pressures of the order of about 1 Torr or less are preferred and extremely high sensitivities can be attained by carrying out the discharge and excitation in a magnetic field sufficient to sustain the discharge at pressures of the order of $10^{-5}$ to $10^{-6}$ Torr using photon counters for detection. Definitive spectral lines or bands are isolated either by a diffraction grating monochromator or band-pass filters. The emission intensity of the spectral line(s) or band(s), which is a function of concentration, is measured by photomultiplier detectors and ancillary electronic read-out. A temperatureprogrammed sample pyrolysis probe can be used on liquid or solid samples to circumvent spectral interference problems. A reference channel in the electro-optical portion of the instrument can be used for stabilization or to null-out background or undesired interfering spectral lines. A multichannel optical system can be used to observe a number of different spectral lines at the same time, thereby detecting different emission lines of the same element or lines of a number of different elements simultaneously.

BRIEF DESCRIPTION OF THE DRAWINGS

The FIG. 1 is a block or schematic diagram type drawing showing a basic microwave-excited emission detector of the invention.

DESCRIPTION OF THE PREFERRED EMBODIMENTS

Figure 1:
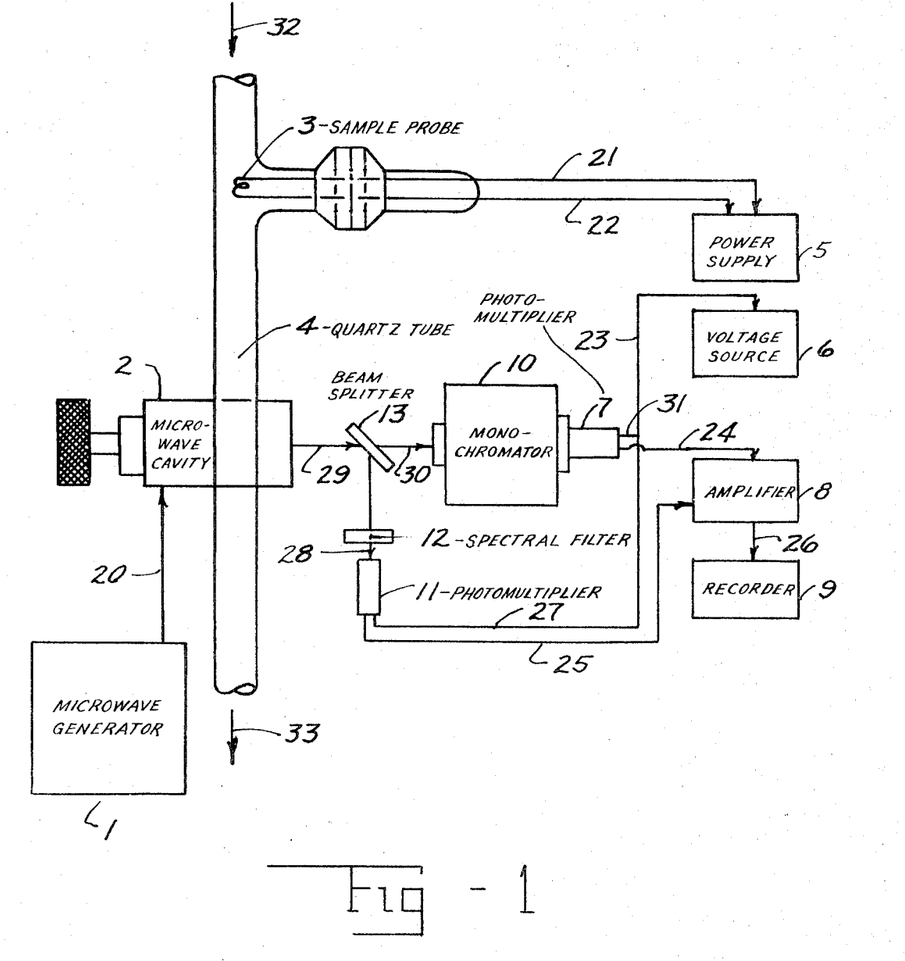

A general schematic view of the basic microwave-excited emission detector is shown in FIG. 1 and can be discussed in terms of the three basic functions which define the instrumental concept: (1) Sample Atomization, (2) Sample Excitation and (3) Electrooptical Read-out.

SAMPLE ATOMIZATION

Figure 2:
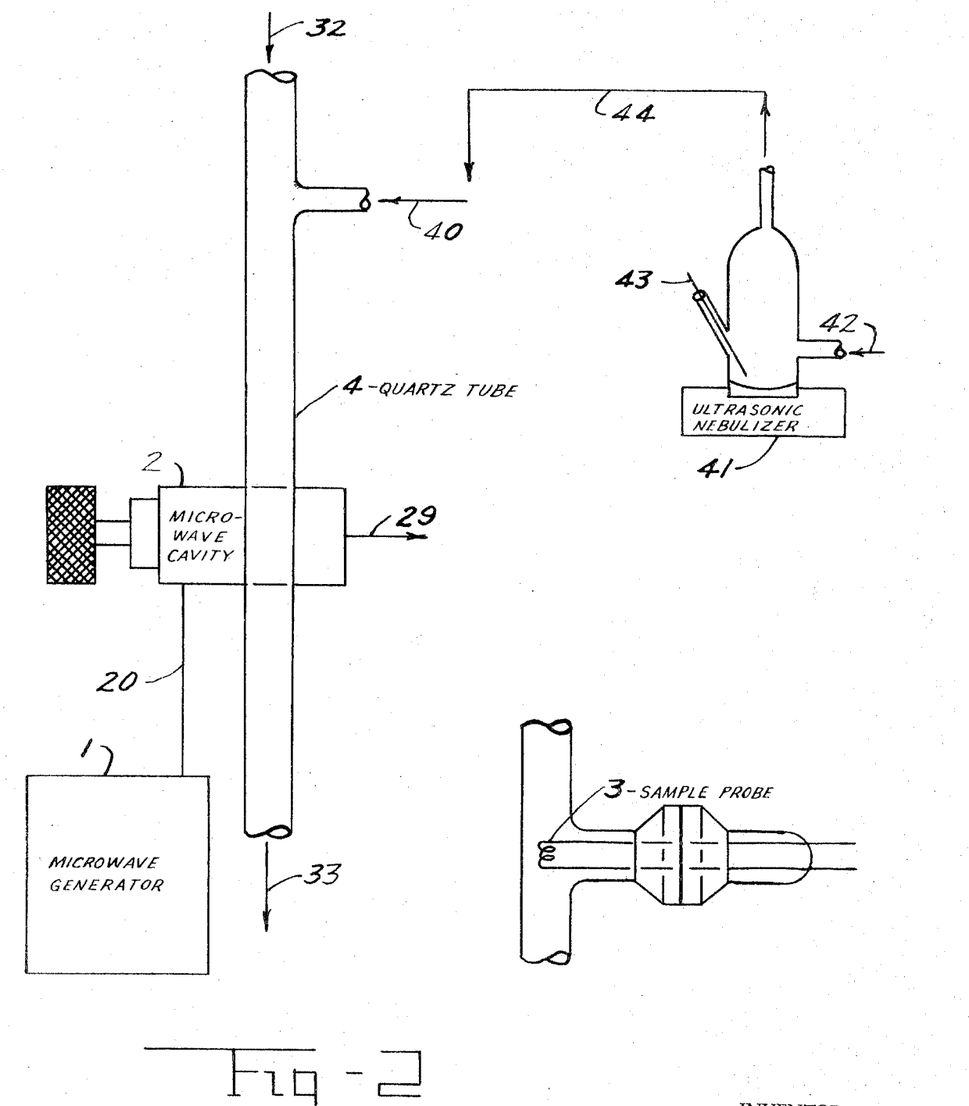
FIG. 2 is a block diagram type drawing showing the multimode sampling capability usable in the detector of the invention.

Sample introduction and atomization processes directly influence the sensitivity and specificity of the microwave-emission detector approach. The multimode aspect of our design shown in FIG. 2, is a unique feature not found in similar detector concepts. In this case, sensitivity, selectivity and specificity for a broad range of elements is enchanced by the capability of handling samples in any physical state--in either gaseous or liquid media--at a range of temperatures and/or pressures. Sample introduction can be on a continuous basis leading to analysis in real time or on a single, time integrated sample format. The multimode feature of the microwave emission detector includes analysis of liquids (including suspensions), gases (including aerosols), and solids (with the use of a pyrolysis probe). This multimode feature of the detector makes it adaptable to a variety of chromatographic configurations including liquid, gas/liquid, and pyrolysis chromatography with no sample pretreatment or preconcentration required. In addition to its inclusion in chromatographic systems as a sensitive and selective detector, the microwave emission detector is capable of operating as an independent analytical mode. This operation mode makes the detector especially adaptable to water, air and emission sources monitoring as well as to process control problems in industry, and bio-medical applications.

Figure 3:
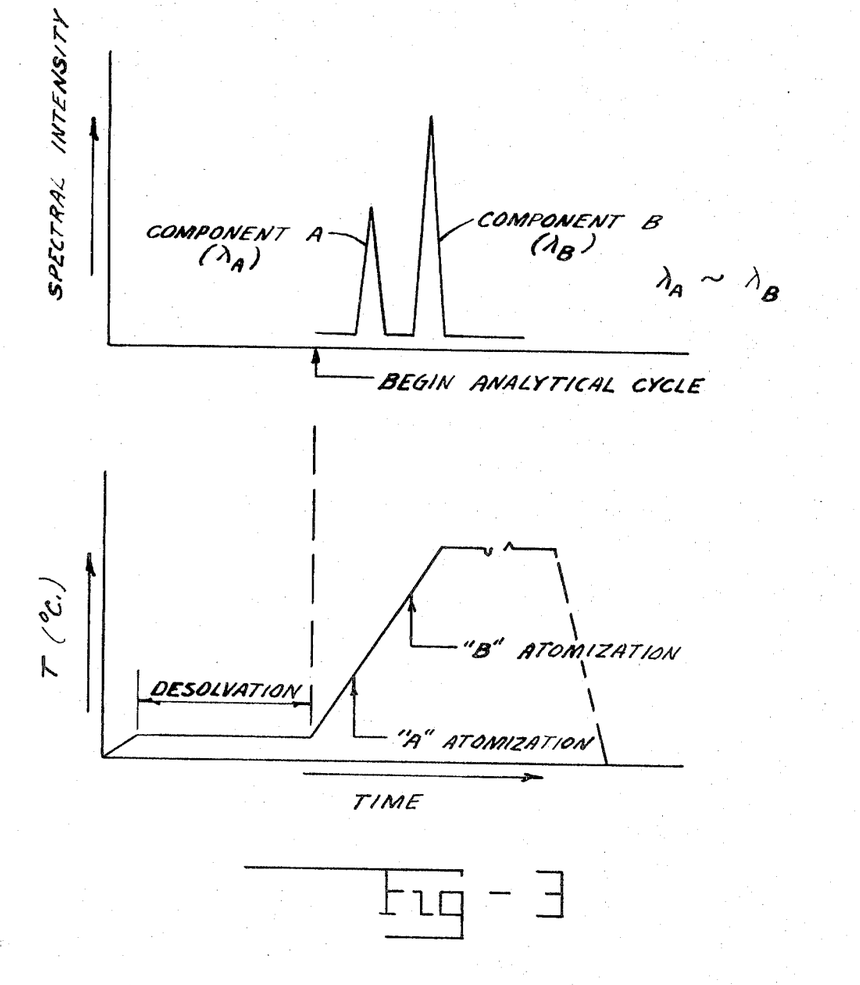
FIG. 3 consist of two graphs on the same time line base illustrating how the temperature-programmed probe of the invention can be used to separate and analyze the spectrum of two different components having substantially the same emission wave length.

A very unique feature of the sampling/atomization system of our microwave emission detector concept is the inclusion of a temperature-programmed sample pyrolysis probe used to thermally atomize samples of interest into the discharge (excitation) zone of the detector. This system is unique in a number of ways and provides many advantages in trace metal detection and analysis whether related to water or airborne particulate monitoring or bio-medical applications. The temperature-programmed probe has been found to be a valuable tool in circumventing many interference problems arising from solvents and other matrices as well as direct interference between metallic and anionic elements. The programmedprobe is roughly analogous to a chromatographic column and its operation is illustrated by FIG. 3. In this case, a temperature program is depicted which first effects desolation of the sample, leaving the metallic constituents (for example) on the probe. As the temperature of the probe is increased, by increasing the current to the probe in a programmed manner, the metallic compounds remaining on the probe are fractionated and are carried into the discharge zone where excitation by the microwave field is achieved. The intensity of the resulting spectral radiation is measured and given in terms of metal concentration. In addition to getting around the matrix interference problem, direct line emission interference (between component A and B) can be avoided in many instances by employing the temperature-programmed probe approach. Cadmium and arsenic provide a good example of this type of interference. The 2288.12 A emission line of arsenic and the 2288.02 A line of cadmium are too close to be spectrally resolved yet these two elements can be singularly detected in a mixture by the temperature-programmed probe technique.

The temperature-programmed probe can be categorized in two general classes, passive and active, depending on their function. The passive type probe is shown in FIGS. 1 and 2 and is designated as such due to the fact that a given sample is placed directly onto the probe and atomized into the excitation zone of the detector. Passive probes can take any of a number of forms. Generally, a simple platinum, rhenium, tungstum, etc., loop approximately one thirty-second inch in diameter will suffice for liquid samples in the order of 1- to 5-microliters. A different, but equally simple geometry is employed to accommodate solid samples, although for either liquid or solid samples, a small cup or a depression in the coil or loop might facilitate adding the sample to the probe.

Active type probes are special application devices and generally operate in two modes, (1) sampling and (2) discharge or analytical mode. These probes are designed specifically for trace metal detection application for airborne particulates but may find even wider application in areas of health physics. The sample probes, of necessity, are of different design and function to collect the particulate from a gas matrix as well as to atomize the sample once it is collected. Basically, the probe can take the form of an electrostatic collector or in more simple terms could consist of a thin metal frit or sponge.

Figure 4:
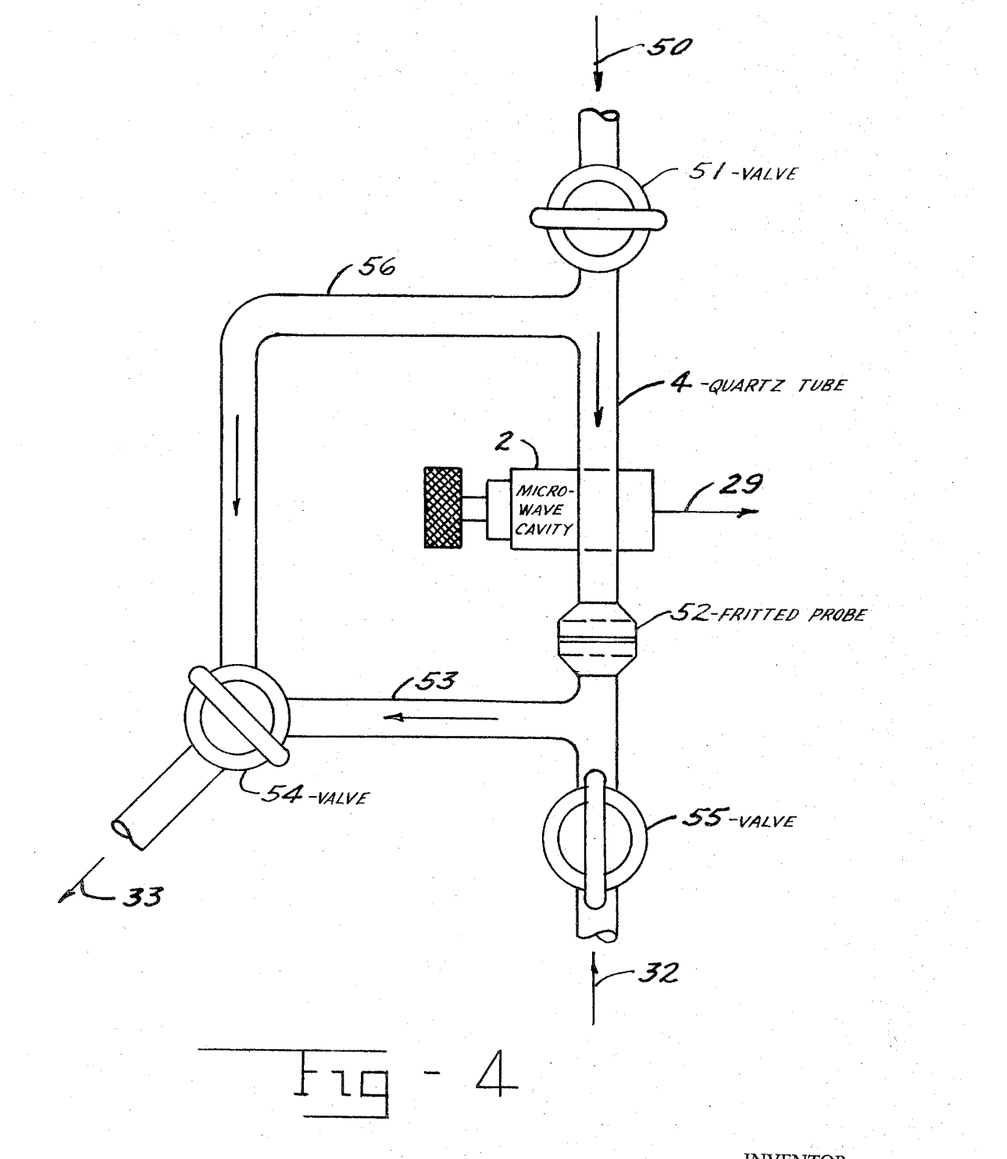
FIG. 4 is a block diagram type drawing of a temperature-programmed fritted-probe of the invention.
Figure 5:
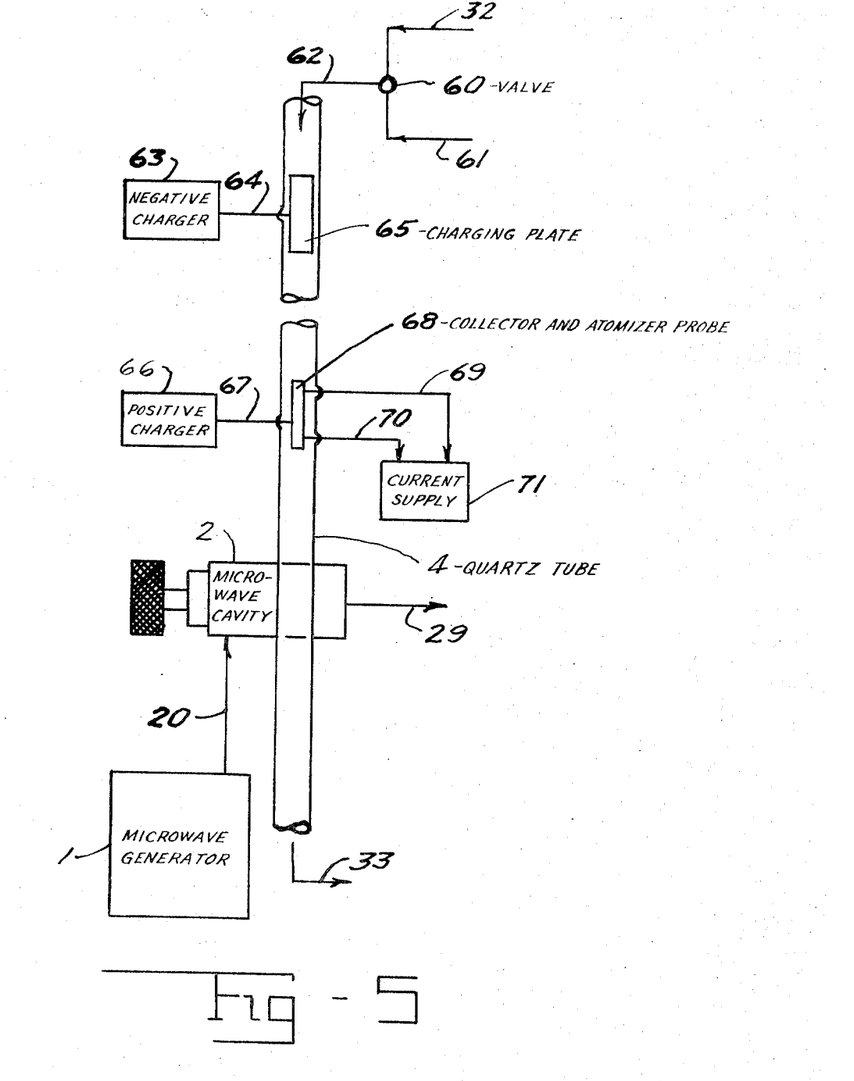
FIG. 5 is a block diagram type drawing of a temperature-programmed electrostatic probe of the invention.

A diagrammatic illustration of the temperatureprogrammed fritted-probe concept is shown in FIG. 4. Operation is in two basic modes: (1) sampling mode and (2) discharge or detection mode. In the sample mode, particulate is collected on the fritted probe by opening the sample inlet valve and applying vacuum to the downstream side of the frit. The discharge valve is in the closed position while sampling is in progress and, obviously, the microwave cavity is not energized. Sampling can be conducted for any period of time and will probably vary depending on the metal(s) being detected. Once an adequate sample has been collected on the frit, the detector is switched to the detection mode by closing the sample inlet valve and applying vacuum to the opposite end of the quartz discharge tube. At this point the discharge valve is opened, admitting a regulated flow of helium to the discharge tube. The discharge gas flow is countercurrent to the sample air flow used in the sampling mode. Once the discharge gas flow is established, energy is applied to the microwave cavity and a discharge is established in the microwave field. The collected sample is atomized by applying a current to the probe. By applying the current in a programmed manner, the temperature of the probe can be made to increase, between limits, at a prescribed rate. The gaseous and metal contituents of the sample will be essentially fractionated off the probe and carried into the discharge zone where excitation of the various species occurs. Measuring the intensity of appropriate lines and/or bands, the concentration of trace metals or non-metallic elements in airborne particulates can be determined A particulate collection and atomization probe concept utilizing an electrostatic approach is shown in FIG. 5. Again, operation is in two modes. In the sampling mode, particulate-laden urban air, for example, is admitted to the system. The sample first passes through a charging zone where the particles are given a negative charge. A positively charged collector probe is located downstream from this charging zone and is charged to a sufficiently high potential to ensure a high collection efficiency. As was the case with the fritted-probe approach, sampling time is regulated primarily by the concentration of the metal(s) found in the environment being sampled. Metals such as lead and mercury, for example, could require very short sampling cycles whereas cadmium could require a considerably longer one. When adequate sample has been deposited on the collector probe, the gas selector valve is switched to a position admitting a regulated flow of helium or other discharge gas through the system. At this time, the potentials on the particle charger and the collector are removed and energy is applied to the microwave cavity thus initiating a discharge. The collector probe also serves to atomize the collected particulate sample into the discharge zone. Atomization and detection is achieved by the same mechanism as described in the fritted probe case.

SAMPLE EXCITATION

Microwave-excited emission overcomes many of the limitations that are encountered when chemical flames and other means are employed as the excitation source. From the standpoint of energetics, a helium microwave discharge, for example, is at an energy level of approximately 25 eV as compared to 5 eV associated with the hottest chemical flames. Other gases can be used instead of helium as discharge gases, e.g. argon, nitrogen, hydrogen, chlorine and in fact most any gas; however, normally an inert gas such as helium or argon will be preferred. While gas temperatures of the microwave discharge may be around 100° to 200°C., electron temperatures in excess of 10,000°K are customarily observed. Consequently, line and/or band intensities are much greater than is possible with flame excitation. Considerably higher populations of excited states, leading to a corresponding increase in sensitivity, are achieved by operating the microwave discharge at 2.45 GHz and higher frequencies and at reduced system pressure (approximately 1 Torr or less). These operational parameters lead to increased intensity, too, resulting from the lack of collisional deactivation of excited atoms which is a serious problem in the case of chemical flames. The variety of processes taking place in flames, i.e., compound formation, chemiluminescence, etc., further complicates the flame case, leading to interferences, extensive spectral backgrounds, and related problems. Because of the thermally uniform nature of the discharge, the emitted radiation is comparatively free from self-reversal effects. It is these main properties, i.e., clean background, intensity, stability, and freedom from self-reversal, together with the narrowness of the spectral line and its purity, that make the microwave discharge particularly suitable for trace elements detector applications.

ELECTRO-OPTICAL READ-OUT

Figure 6:
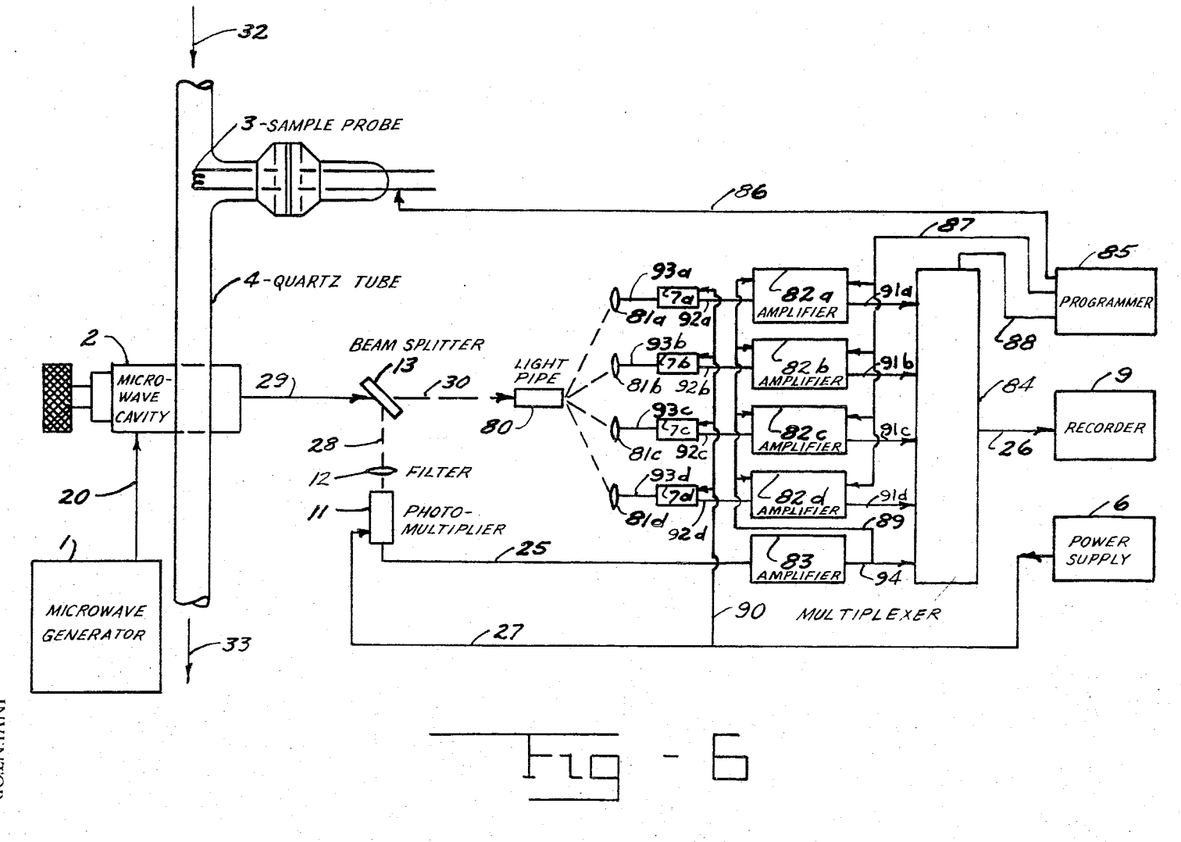
FIG. 6 is a block diagram type drawing of a temperature-programmed probe multichannel microwave emission detector of the invention.

The utility and functionality of the microwave emission detector approach shown in FIG. 1 can be increased substantially by incorporating additional analytical channels to the instrument design. A number of important gains are made by this addition. The first gain, obviously, is a degree of multifunctionality, providing the capability to detect and monitor a given number of elements simultaneously. This multifunctionality serves in another important way inasmuch as it also provides for increased detector specificity thus circumventing many interference problems alluded to earlier. A generalized schematic view of the multichannel microwave emission detector is shown in FIG. 6, and will be discussed in terms of the electro-optical considerations. Sample atomization and excitation remains as previously described.

The multichannel detector incorporates only four analytical channels at the present time, but additional channels can be added as required. The dispersive element(s) can take a number of forms but generally is a narrow band-pass filter (FIG. 6) or a small plane grating spectrograph as shown in FIG. 1. In the latter case the photodetectors are arranged at the focal plane of the spectrograph to pass any wavelength if interest. The electronic signal processing readout system for the photodetectors consists of four signal channels, a differential background or reference channel, a digital programmer, and the other necessary circuitry to perform the required operations. Each signal channel incorporates an electrometer, i.e., a current-to-voltage converter, the selection of linear or logarithmically compressed signals, automatic baseline compensation, and a signal integrator/storage memory. Signal data is acquired and stored simultaneously, and upon interrogation by the program unit, this stored data is sequentially read out on a strip chart recorder.

The ultimate detection sensitivity of any detection approach hinges to a great extent on its stability. In the case of the microwave emission detector, the stability of the excitation source is of primary concern. To ensure the high degree of source stability required, a small fraction (approximately 1 percent) of the radiant beam emanating from the discharge zone is split off, a spectral band isolated by a band pass filter, and the intensity of the band monitored by a photomultiplier detector. Small perturbations in the source, arising from discharge instability, are "nulled-out" electronically by incorporating this type of reference channel in the electro-optical segment of the detector. This is accomplished by processing the signal from the reference channel and the analytical channel(s) through a differential amplifier. The optical band-pass of the reference beam is selected on the basis that it reflects strong dependence on salient discharge parameters such as flow, pressure, power input, etc. Small changes in source intensity, consequently are detected and substracted from the analytical channel.

The multichannel feature of the detector coupled with the multimode sampling capability and temperature-programmed probe, make this concept more functional in terms of broad-spectrum analytical and monitoring applications, multifunctionality, operational sensitivity, specificity, stability, etc. As was stated previously, the obvious advantage of the multichannel design is analytical multifunctionality. Equally important, however, the multichannel feature of the design can lead to a considerably higher degree of detector specificity than is attained by other instrumentation and can function to minimize interference problems. This is accomplished by relying on more than one spectral feature to characterize and quantify the sample under investigation. "Spectral signatures" are determined for the material and the detector "programmed" with respect to the "spectral signature" obtained. One important application of this approach can be used for the purpose of illustration asbestos monitoring in and near sources. For this application a temperature-programmed probe similar to one of those shown in FIGS. 4 and 5 is employed with the multichannel detector. The refractory nature of asbestos requires a high probe temperature to achieve sample atomization into the discharge zone. Other particulate matter sampled with the asbestos is "boiled" off the probe at lower temperatures before atomization of asbestos is achieved. By utilizing the probe cracking pattern and the "spectral signature," atom ratios (e.g. Mg/Al, Mg/Fe) can be established to translate the elemental analysis data to molecular asbestos concentration on a weight/volume basis.

UNIQUE DETECTOR FEATURES

A summary of the unique features which characterize my microwave-excited emission detector concept is given below:

Sample Introduction And Atomization
 1. Multimode Sampling: Gas, Liquid, And Solid Phase.
 2. Time Integrated And/Or Real Time Sampling.
 3. Temperature-Programmed Probe.
Sample Excitation 1. Microwave Excitation At 2.45 GHz And Higher Frequencies (11.2 GHz).
2. Low Pressure Operation → Increased Sensitivity.

Electro-Optical Read-Out
1. Multi-Analytical Channels → Simultaneous MultiElement Analysis.
2. Multi-Analytical Channels/Temperature-Programmed Probe → Increased Specificity.
3. Multi-Analytical Channels/Temperature-Programmed Probe → Reduced Analytical Interferences.
4. Multi-Analytical Channels/Reference Channel → Increased Stability and Increased Sensitivity.

FIG. 1 describes my basic microwave-excited emission detector design. Microwave generator 1 generates energy at a frequency at about 2.45 GHz or higher if desired and this energy proceeds by coaxial line or wave guide 20 to microwave cavity 2. A discharge gas such as helium is introduced by line 32 to one end of quartz discharge tube 4. The sample to be analyzed in liquid or solid form has been deposited on sample probe 3 and is atomized or vaporized by heating the sample probe. The power is provided to the sample probe by power supply 5 by lines 21 and 22. The atomized sample and discharge gas proceed down quartz discharge tube 4 into the area of the quartz discharge tube surrounded by microwave cavity 2 and at this point are irradiated by microwave energy from the cavity to produce a helium discharge at power levels of approximately 30 – 80 watts. The energy in the helium discharge excites the gaseous sample which emits light having wavelength characteristic of the components of the sample. This light proceeds out of quartz tube 4 and out through an optical window in the end of microwave cavity 2 in the direction of arrow line 29 to contact beam splitter 13. About 99 percent of the light contacting beam splitter 13 is transmitted in the direction of arrowed line 30 to monochromator 10 which passes a narrow spectral band of light of the frequency or wavelength of the atom for which the sample is being analyzed. The output of the monochromator goes to photomultiplier 7 where the light energy is changed to an electrical signal proportional to the intensity of the light. Photomultiplier 7 receives its voltage from hi-voltage source 6 by lines 23 and 31. In many cases in the figures the second (ground) wire is not shown so as not to unnecessarily complicate the figures. The electrical output of the photomultiplier 7 goes by line 24 to differential amplifier 8. Approximately 1 percent of the light hitting beam splitter 13 is reflected through spectal filter 12 to photomultiplier 11 in the direction indicated by arrowed line 28. Spectral filter 12 is normally a broad band filter transmitting light characteristic of the background light which tend to hide the light emitted by the sample. In photomultiplier 11 the light energy is changed to electrical energy proportional to the intensity of the light energy, and the output of photomultiplier 11 goes by line 25 to differential amplifier 8 where it is compared and substracted from the output of photomultiplier 7. Power is furnished to photomultiplier 11 by lines 23 and 27 from hi-voltage source 6. The use of the reference channel through spectral filter 12 and photomultiplier 11 serves two important purposes in my detector which are to increase stability and sensitivity. The helium discharge generated in the quartz tube will be absolutely constant in energy and so the excitation of the sample will not be at a constant energy level. In the differential amplifier through the use of the reference channel these variations in energy are nulledout. Also of course by substracting the background energy in the differential amplifier, substantially only the energy of the atom being analyzed for it transmitted from the differential amplifier by line 26 to recorder 9 and so the sensitivity of the detector is improved.

FIG. 2 shows the multimode sampling capability of my detector. The drawing on the left of FIG. 2 represents the corresponding portion of the drawing of FIG. 1 except that sample probe 3 has been replaced by sample gas inlet 40 since it is assumed that the sample is already in gaseous form. If the sample is in liquid form an ultrasonic nebulizer 41 can be used to nebulize the sample. Liquid sample is introduced into the nebulizer through sample port 43. A carrier gas, which can be helium, is introduced to the nebulizer by line 42 to transport a portion of the liquid in vapor or aerosol form and and goes by line 44 to sample gas inlet 40 for analyses. As pointed out in discussing FIG. 1 if the sample is in either liquid or solid form, it can be deposited on a sample probe 3 shown in the lower right hand corner of FIG. 2 and corresponding to sample probe 3 of FIG. 1. The sample is then vaporized by heating the probe as described in FIG. 1. Thus, it is seen that samples in gaseous, liquid or solid form can be handled by our detector.

FIG. 3 shows a simulated analyses using a temperature-programmed probe of my invention. The lower graph of the figure shows a time vs. temperature plot indicating the heating cycle of the probe. Especially in the case of the liquid samples, but possibly also in the case of solid samples a low temperature desolvation period is shown wherein the liquid or other components not to be analyzed in the sample are removed before the analytical cycle begins. The beginning of the analytical cycle is shown on the same time line in the upper graph of FIG. 3. In the next time cycle of heating, the probe temperature is increased until first component A is atomized and so separately analyzed and then at a later time as the temperature becomes sufficiently high component B is atomized and separately analyzed. The upper graph of FIG. 3 is a plot on the same time line as the lower graph and is a plot of time vs. spectral intensity. Thus, it is shown that component A having a characteristic spectral wavelength $\lambda_A$ approximately the same as the characteristic spectral wavelength of component B, $\lambda_B$ can be separated and separately analyzed using my temperature-programmed probe. The temperature-programmed probe can be the sample probe 3 such as shown in FIG. 1 or one of the probes shown in either FIG. 4 or FIG. 5 depending on the nature of the sample being analyzed.

FIG. 4 shows a temperature-programmed fritted probe of the invention and associated equipment wherein corresponding elements of FIG. 1 are labeled with the same numbers. A gas particulate sample to be analyzed is introduced at point 50 into quartz discharge tube 4 through sample inlet valve 51. The sample proceeds down through the quartz tube to fritted probe 52 and particulate in the gas sample is deposited on and retained by the fritted probe, the gas free of particulate proceeds by line 53 through vacuum selector valve 54 to the vacuum system by outlet 33. After a suitable sample has been passed through the fritted probe, sample inlet valve 51 is turned off, vacuum selector valve 54 is turned to connect line 56 with the vacuum system, energy is furnished to microwave cavity 2, helium is introduced at inlet 32 through discharge gas valve 55 which is now opened and the heating time cycle for the temperature-programmed fritted probe 52 is actuated in a similar fashion to that described in FIG. 3. The particulate matter is vaporized from the fritted probe, passes up the quartz tube with the helium and is excited by the helium discharge to emit its own characteristic wavelength light for analyses by monochromator and associated system as shown in FIG. 1. The excited sample and helium passes on up quartz tube 4 to line 56 through vacuum selector valve 54 to outlet 33 and the vacuum system.

An electrostatic temperature-programmed probe is described in FIG. 5. A sample gas for analyses is introduced by line 61 through gas selector valve 60 to inlet line 62 and to quartz discharge tube 4 as shown. A negative potential is placed on particle charging plate 65 by negative charging potential 63 via line 64. As the particulate in the sample gas comes into the electric field associated with the particle charging plate 65, a negative potential is placed on each particle. The solid particles in the gas continue down the quartz tube and are collected on collector and atomization probe 68 which has a positive potential place thereon. The positive potential is placed on probe 68 by positive charging potential 66 by line 67. The gas sample minus the particles removed by the collector probe passes on down the quartz tube and out the lower end 33 to the vacuum system not shown. When a sufficient sample of the gas has been taken to collect sufficient particles for analyses, the sample gas selector valve 60 is adjusted to shut off the gas sample and turn on helium discharge gas line 32 which then introduces helium by line 62 to the upper end of quartz discharge tube 4. Probe 68 is now activated by probe programmed current supply 71 transmitted to the probe via lines 69 and 70 in a time/temperature cycle similar to that described in FIG. 3. Previous to this of course particle charging plate 65 has been deactivated by turning off the negative charging potential and the positive potential has been removed from probe 68 by turning off the positive charging potential 66. Atomized particles from probe 68 proceed with helium down through the area of the quartz discharge tube surrounded by the microwave cavity 2 wherein they are excited to give off their characteristic wavelength light for analyses in a mammer similar to that described in FIG. 1. Then the excited gas proceeds out the lower end of quartz discharge tube 4 to the vacuum system not shown.

FIG. 6 describes a temperature-programmed probe multichannel microwave emission detector of the invention. Again, as in previous figures, identical components with FIG. 1 are labeled with the same numbers as in FIG. 1. Microwave source 1 provides microwave energy as in FIG. 1 to microwave cavity 2 via wave guide or coaxial line 20. Helium discharge gas is introduced at the upper end of quartz discharge tube 4 at 32 and sample probe 3 is provided to atomize or vaporize the sample. The vaporized sample and helium flow down through the quartz tube into the area of the quartz tube surrounded by the microwave cavity and the sample atoms are excited by the helium gas discharge as in the FIG. 1 detector. The gas then passes on down and out the end of the quartz discharge tube at 33 to the vacuum or the pressure regulating system. Light generated in the quartz tube in the area surrounded by the microwave cavity proceeds out through the walls of the quartz tube and an optical window in the end of the cavity in the direction indicated by the arrowed line 29 to beam splitter 13 which passes about 99% of the light beam in the direction indicated by arrowed line 30. About 1 percent of the light beam is reflected by beam splitter 13 and passes in the direction indicated by arrowed line 28 through broad band pass filter 12 to photomultiplier 11 which generates the reference electrical signal for the detector. Hi-voltage supply 6 furnishes the power to photomultiplier 11 by line 27. The output of photomultiplier 11 proceeds by line 25 to reference amplifier 83 which is driven by a power source not shown. A portion of the output from reference amplifier 83 goes by line 94 to multiplexer 84 which programs this output by line 26 to recorder 9 at an appropriate time. The light transmitted through beam splitter 13 in the direction shown by arrowed line 30 enters light pipe 80 and is split into four different beams for transmission to the four different analytical channels to be described below. One portion of this light from the light pipe goes by arrowed line 93a through narrow band-pass filter 81a to photodetector 7a and the output of photodetector 7a goes by line 92a to differential amplifier 82a. Line 89 represents a cable of four lines of output from reference amplifier 83 and one of these lines is attached to differential amplifier 82a to compare the reference signal with the signal transmitted from photodetector 7a. Narrow band-pass filter 81a has passed a very limited wavelength of light indicative of one of the elements which is to be determined by the detector. The output signal of differential amplifier 82a goes by line 91a to multiplexer 84 wherein it is programmed for individual recording on recorder 9 via line 26. In FIG. 6 and some of the other figures only one electrical line is shown connecting various of the components and of course it is assumed that the other line is grounded. It will be noted that programmer 85 is connected to a number of different components and performs a number of different programming functions. Programmer 85 is connected by line 86 to sample probe 3 and by means of a time/temperature-program similar to that shown in FIG. 3 gradually raises the temperature of sample probe 3 to atomize the sample on the probe. Programmer 85 is connected by a cable of lines 87 containing a line for attachment to 82d. The purpose of this program signal is to initiate the data acquisition integrator circuits of each channel simultaneously. Also programmer 85 is connected by a cable of lines to multiplexer 84 for sequential interrogation by the recorder 9, of the channel integrators. Line 90 representing a cable of lines from power supply 6 provides hi-voltage power to drive each of the photomultipliers 92a, 92b, 92c, and 92d. The analytical channel represented by narrow band-pass filter 81b, 93b light directional line, 7b photomultiplier, 92b line connecting the output of the photomultiplier to differential amplifier 82b, and differential amplifier 82b, output to multiplexer line 91b represent a second analytical channel for analyzing another narrow band frequency of the light, indicative of a different element or another band of the same element than that in the previously discussed analytical channel 81a etc. The other two channels beginning with 81c and 81d narrow-band pass filters, respectively, are for the analyses of other narrow frequency bands of light than analytical channels represented by band pass filters 81a and 81b. In the case of each analytical channel, and there could be more or less of these channels depending on the number of elements or spectral lines desired to be simultaneously analyzed, the reference signal is compared in a differential amplifier for the channel to increase stability and increase sensitivity for each channel.

Although the invention has been described in terms of specified embodiments, which are set forth in considerable detail, it should be understood that this is by way if illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What I claim is:

1. A method for exciting a gaseous sample comprising mixing said sample with a discharge gas, subjecting said mixture to a pressure of about 1 Torr or less, and irradiating said mixture under vacuum with sufficient microwave energy at frequencies of at least about 1 GHz to cause discharge gas to discharge and excite atoms in said sample to emit light of frequencies characteristic of the atoms.

2. A method of claim 1 wherein said irradiation is carried out in a magnetic field sufficient to sustain the gas discharge at a pressure of about $10^{-5}$ to $10^{-6}$ Torr.

3. A microwave-excited emission detector comprising:
   a. a hollow discharge tube,
   b. means to introduce a discharge gas to said tube,
   c. means to introduce a sample to said tube,
   d. a microwave energy source capable of generating microwaves having frequencies of at least about 1 GHz,
   e. means to irradiate inside discharge tube with said microwave energy,
   f. means adapted to view light emission from said discharge tube and separate a narrow band of light frequencies,
   g. means to view said narrow band of light frequencies and transform the light energy to electrical energy indicative of the intensity of said light energy,
   h. means to measure the quantity of said electrical energy, and
   i. vacuum means are connected to said discharge tube and are capable of maintaining a pressure in said discharge tube of about 1 Torr or less.

4. A detector of claim 3 wherein magnetic means are provided capable of furnishing a magnetic field sufficient to sustain a gas discharge and in which to carry out the discharge and excitation, said vacuum means being capable of maintaining a pressure of about $10^{-5}$ to $10^{-6}$ Torr, and photon counter means are used for light emission detection.

5. A detector of claim 3 wherein a reference means is provided to view light emission from said discharge tube and separate a band of light energy to serve as a comparative reference to said narrow band of light frequencies, means to transform light energy from said reference means to electrical energy indicative of the intensity of said light energy, and means to compare the electrical energy from said narrow band of light frequencies with the electrical energy from said references means to increase the stability and sensitivity of said detector.

6. A detector of claim 3 wherein multiple means are provided to view light emission from said discharge tube, each of said multiple means separates a different narrow band of light frequencies, means are provided for each said multiple means to transform light energy to electrical energy indicative of the intensity of said light, and means are provided for each said multiple means to measure the quantity of said electrical energy.

7. A detector of claim 3 wherein means are provided to convert liquid and solid samples to gaseous form for analysis in said detector.

8. A microwave-exciting emission system comprising:
   a. a hollow discharge tube,
   b. means to introduce a discharge gas to said tube,
   c. means to introduce a sample to said tube,
   d. a microwave energy source capable of generating microwaves having frequencies of at least about 1 GHz,
   e. means to irradiate inside said discharge tube using said microwave energy, and
   f. vacuum means connected to said discharge tube and capable of maintaining a vacuum in said discharge tube of about 1 Torr or less.

9. A system of claim 8 wherein said temperature-programmed probe is associated with said hollow discharge tube to discharge a vaporized sample into said tube, said probe comprising an electrical filament on which a liquid or solid sample can be deposited, and means to furnish current to said filament to gradually heat the filament in a programmed cycle of temperature and time sufficient to fractionally vaporize a sample.

10. A sample analysis method comprising the following steps:
   a. mixing a sample in gaseous form with a discharge gas,
   b. irradiating said mixture under vacuum at a pressure of about 1 Torr or less with sufficient microwave energy at a frequency at least about 1 GHz to cause said discharge gas to discharge and to excite atoms in said sample to emit light of frequencies characteristic of the atoms,
   c. separating from the light emitted by said irradiated mixture a narrow band of light frequencies containing a frequency characteristic of an atom for which analysis is being made,
   d. transforming said band of light frequencies from light energy to electrical energy indicative of the intensity of said light energy, and
   e. measuring the quantity of said electrical energy.

11. A method of claim 10 wherein the discharge and excitation are carried out in a magnetic field sufficient to sustain the discharge and the pressure is about $10^{-5}$ to $10^{-6}$ Torr.

12. A method of claim 10 wherein a reference band of light frequencies is separated, said reference band is transformed from light energy to electrical energy indicative of the intensity of said reference light energy, and said reference electrical energy is compared with the electrical energy from said narrow band to increase the stability and sensitivity of said method.

13. A method of claim 10 wherein multiple narrow bands of light of different frequencies are separated from the light emitted by said irradiated mixture and each band contains a frequency characteristic of an atom for which analysis is being made, the light of each said band is separately transformed from light energy to electrical energy indicative of the intensity of the light energy, and the quantity of electrical energy is measured for each said band.

14. A method of claim 13 wherein a reference band of light frequencies is separated, said reference band is transformed from light energy to electrical energy indicative of the intensity of said reference light energy, and said reference electrical energy is compared with the electrical energy of each multiple narrow band to increase the stability and sensitivity of said method.

* * * * *